US005755216A

United States Patent [19]

Salyer

[11] Patent Number: 5,755,216
[45] Date of Patent: May 26, 1998

[54] BUILDING PRODUCTS INCORPORATING PHASE CHANGE MATERIALS AND METHOD OF MAKING SAME

[75] Inventor: Ival O. Salyer, Dayton, Ohio

[73] Assignee: The University of Dayton, Dayton, Ohio

[21] Appl. No.: 468,443

[22] Filed: Jun. 6, 1995

[51] Int. Cl.⁶ .................................................. F24J 2/36
[52] U.S. Cl. ........................ 126/618; 126/617; 126/619; 126/400
[58] Field of Search ............................ 126/618, 619, 126/617, 400; 165/202, 53, 104.26

[56] References Cited

U.S. PATENT DOCUMENTS

| | | |
|---|---|---|
| Re. 34,880 | 3/1995 | Salyer . |
| 3,720,198 | 3/1973 | Laing et al. ........................ 126/400 |
| 4,150,662 | 4/1979 | Summers ........................... 237/1 A |
| 4,237,023 | 12/1980 | Johnson et al. . |
| 4,241,782 | 12/1980 | Schoenfelder ..................... 126/400 |
| 4,259,401 | 3/1981 | Chahroudi et al. . |
| 4,587,279 | 5/1986 | Salyer et al. ....................... 523/206 |
| 4,617,332 | 10/1986 | Salyer et al. ....................... 524/4 |
| 4,711,813 | 12/1987 | Salyer . |
| 4,797,160 | 1/1989 | Salyer . |
| 4,825,939 | 5/1989 | Salyer et al. ....................... 165/53 |
| 4,908,166 | 3/1990 | Salyer . |
| 4,964,402 | 10/1990 | Grim et al. ........................ 128/80 |
| 4,988,543 | 1/1991 | Houle et al. . |
| 5,053,446 | 10/1991 | Salyer . |
| 5,106,520 | 4/1992 | Salyer . |
| 5,211,949 | 5/1993 | Salyer . |
| 5,254,380 | 10/1993 | Salyer ............................ 428/35.7 |
| 5,282,994 | 2/1994 | Salyer . |
| 5,349,798 | 9/1994 | Gross . |
| 5,370,814 | 12/1994 | Salyer ............................ 252/70 |
| 5,477,917 | 12/1995 | Salyer ........................... 165/104.26 |
| 5,532,039 | 7/1996 | Payne et al. ..................... 428/116 |
| 5,553,662 | 9/1996 | Longardner et al. ............. 165/202 |
| 5,565,132 | 10/1996 | Salyer ............................ 252/70 |
| 5,571,878 | 11/1996 | Latiolais et al. ................. 526/65 |
| 5,574,078 | 11/1996 | Elwakil ........................... 523/161 |

OTHER PUBLICATIONS

L.E. Kukacka et al, "Encapsulation of Phase Change Materials in Concrete Masonry Construction", Brookhaven National Lab., published 1977, p. 28.

Chahroudi et l, "Thermocrete and Thermotile Building Components with Isothermal Heat Storage", Suntek Research Assoc., published 1977, pp. 147–151.

Chahroudi, "Engineering Design for Thermocrete Central Storage Units for Low Temperature Solar Application", Suntek Research Assoc., published Mar. 1979, pp. 214–215.

Shapiro et al, "Stabilcrete: A Family of Thermal Ballast Building Bricks and Blocks", Proceedings of Intersol '85, published 1985, p. 183.

Final Report, Central States Energy Research Corp., Nov. 1982.

(List continued on next page.)

Primary Examiner—Larry Jones
Attorney, Agent, or Firm—Killworth, Gottman, Hagan & Schaeff, L.L.P.

[57] ABSTRACT

A building product having thermal energy storage properties in the form of a cementitious hollow core building block having a hollow core or cores and having within the hollow core(s) a composite containing a phase change material. The composite may be a cementitious plug sized to fit the hollow core(s) and having a phase change material imbibed into the pores and matrix thereof or having polyolefin pellets containing a phase change material or silica particles containing a phase change material incorporated at the wet mix stage of formation of the cementitious plug. The composite may also be a polyolefin plug sized to fit hollow core(s) and having a phase change material contained within the matrix thereof. Finally the composite may be polyolefin pellets containing a phase change material or silica particles containing a phase change material packed in a container sized to fit the hollow core(s).

22 Claims, 1 Drawing Sheet

OTHER PUBLICATIONS

D.W. Hawes et al, "Latent Heat Storage in Concrete", *Solar Energy Materials*, Apr., 1989, pp. 335–348.

D. Feldman et al, "The Compressive Strength of Cement Blocks Permeated with an Organic Phase Change Material", *Energy and Buildings*, 6 (1984) pp. 85–92.

D.W. Hawes et al, "Absorption of Phase Change Materials in Concrete", *Solar Energy Materials and Solar Cells*, 27 (1992), pp. 91–101.

D.W. Hawes et al, "The Stability of Phase Change Materials in Concrete", *Solar Energy Materials and Solar Cells*, 27 (1992) pp. 103–118.

S.A. Mumma et al, "PCM–crete Energy Storage and Building Element", Am. Section of the Int. Solar Energy Soc. Conf., published 1980 pp. 243–246.

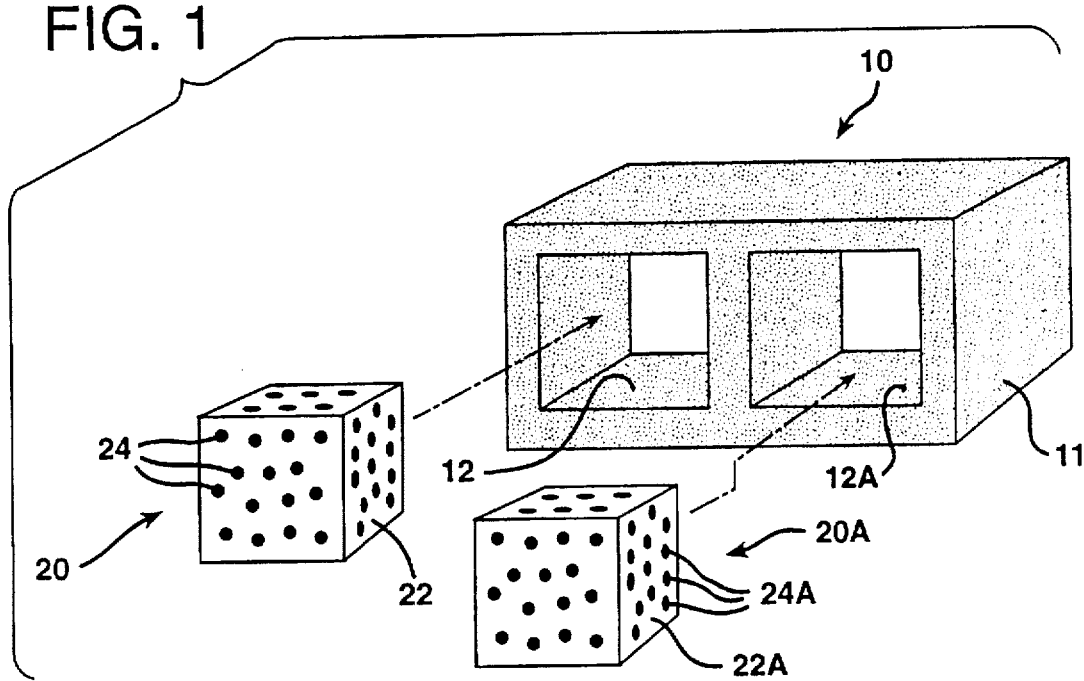
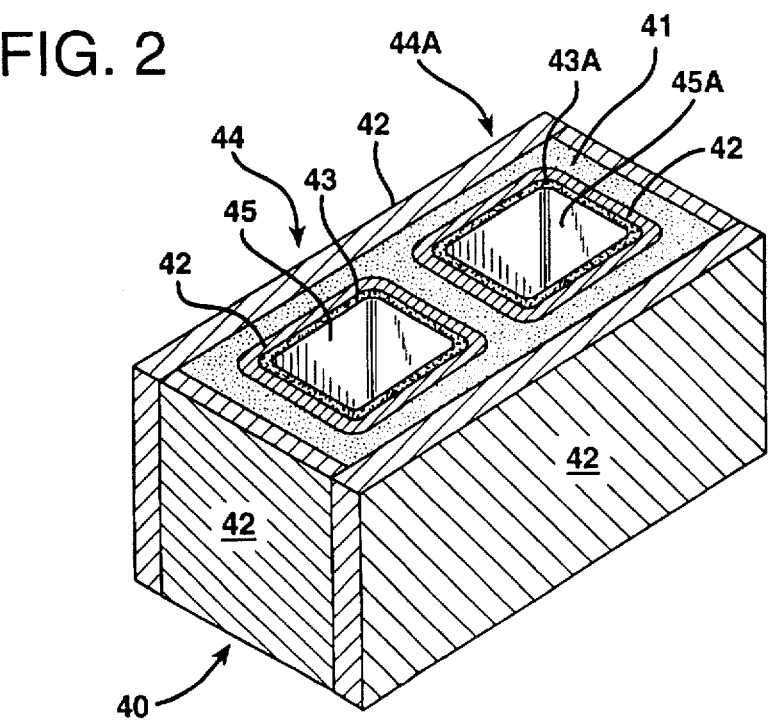

BUILDING PRODUCTS INCORPORATING PHASE CHANGE MATERIALS AND METHOD OF MAKING SAME

BACKGROUND OF THE INVENTION

The present invention relates to building products having thermal energy storage properties and method of making same, and more particularly, to cementitious building products in the form of a cementitious hollow core building block containing a phase change material in the core(s) thereof.

Phase change materials may be repeatedly converted between solid and liquid phases and utilize their latent heat of fusion to absorb, store and release heat or cool during such phase conversions.

These latent heats of fusion are greater than the sensible heat capacities of materials. For example, in phase change materials, the amount of energy absorbed upon melting or released upon freezing is much greater than the amount of energy absorbed or released upon increasing or decreasing the temperature of a material over an increment of 10° C.

Upon melting and freezing, per unit weight, a phase change material absorbs and releases substantially more energy than a sensible heat storage material that is heated or cooled over the same temperature range. In contrast to a sensible heat storage material that absorbs and releases energy essentially uniformly over a broad temperature range, a phase change material absorbs and releases a large quantity of energy in the vicinity of its melting/freezing point. However, due to its relatively high specific heat, the phase change material can supply a significant amount of sensible heat as well.

The problem with such phase change materials is in containing them in an appropriate matrix. In my U.S. Pat. No. 5,053,446, there is disclosed a polyolefin matrix containment system; in my U.S. Pat. No. 4,797,160, there is disclosed use of a cementitious matrix containing alkyl hydrocarbon phase change materials neat or in pellets or granules formed by incorporating the alkyl hydrocarbon phase change material in polymers or rubbers; in my U.S. Pat. Nos. 5,106,520 and 5,282,994, there is disclosed a free flowing, conformable powderlike mix of silica particles and a phase change material; and in U.S. Pat. No. Re. 34,880 there is disclosed a linear alkyl hydrocarbon phase change material having a carbon chain length of C-14 and greater inbibed into cementitious building materials.

Phase change materials are of particular interest in the architectural and building trades where climate control and its concomitant energy consumption is one of the principal considerations in building design and material selection.

A variety of building products and techniques have previously been used to conserve heat or cool and thereby reduce energy costs. See, for example, Gross U.S. Pat. No. 5,349,798 which discloses an insulating insert that fits into the hollow core(s) of concrete building blocks. It is also known to incorporate phase change materials into building products. Energy in excess of that necessary to maintain comfort conditions is inherently absorbed and subsequently released when the surrounding environment drops below the comfort range. Thus, in winter months, phase change materials incorporated into structural elements in the walls or floors of buildings and the like can absorb solar energy during daytime hours and release it to the interior at night as temperatures drop. In summer months, the same phase change material, due to its thermostatic character, conserves coolness by absorbing nighttime energy and releasing it during the day.

Among the teachings which were available in the art prior to the present invention are those of U.S. Pat. No. 4,259,401 to Chahroudi et al which discloses both structural and non-structural building products incorporating phase change materials. These building products are made up of a rigid porous matrix structure which is impregnated with the phase change material or which may otherwise contain the phase change material (see, e.g., FIG. 10). Three classes of phase change materials are disclosed, namely, hydrated salts, waxes, and clathrates. Cements, plasters or thermosetting materials may form the rigid matrix.

Reference is also made to Johnson et al. U.S. Pat. No. 4,237,023, where there is disclosed aqueous heat-storage compositions useful in space heating applications such as by inserting flexible pouches containing the compositions in the core volume of a rigid shell.

Finally, Houle in U.S. Pat. No. 4,988,543 discloses a method and apparatus for impregnating one side of a porous board, such as gypsum boards, with a precise amount of compatible phase change material.

While these various phase change material containment means have made it practical to use phase change materials for thermal energy storage in a large number of fields, in the area of cementitious building products there remains room for improvement. Direct incorporation of phase change materials into cementitious building products can reduce the strength properties of those products. In addition, because the phase change materials are generally flammable, measures have had to be taken to render fire retardant the cementitious building products incorporating the phase change material. See, for example, my U.S. Pat. No. 5,053,446, where it is suggested that flameresistant halogenated hydrocarbons be added as fire-retardant additives along with the phase change materials.

Still, if it were possible to avoid the loss of strength properties and flammability problems are avoided, then incorporation of phase change materials for thermal storage in building products could be better achieved.

SUMMARY OF THE INVENTION

The present invention solves both the strength reduction and fire hazard problems by incorporating the phase change material into composites that can be inserted in the normal hollow core or cores of cementitious hollow core building blocks after the blocks are formed or inserted into the blocks as a wall, for example, is being laid-up. The phase change material is added to the building block without detracting from the strength properties of the block. Further, containing the composites having the phase change material therein in the hollow core(s) does not introduce an unacceptable fire hazard, since the core is surrounded on all sides with non-combustible concrete, and thus shielded from both inside and outside fire sources.

The composite may be a polyolefin matrix having a phase change material, preferably a crystalline alkyl hydrocarbon having a heat of fusion of greater than about 30 cal/g, contained within the matrix thereof. The polyolefin matrix may be in the form of polyolefin pellets packed in a container sized to fit the hollow core(s) of a cementitious hollow core building block or a molded polyolefin plug sized to fit in the hollow core(s). The container may be a plastic bag, a metallic pouch, a plastic box, a glass or metal box or the pellets may be simply poured into the hollow core space. The polyolefin is preferably either a crosslinked high density polyethylene or a high density polyethylene/ethylene vinyl acetate blend; although, other crosslinked or uncrosslinked polyolefins such as low density polyethylenes, polypropylenes, polybutenes, etc. are also useful. The phase change material may have additives added to it such as fire retardants, heat transfer agents, or mixtures thereof.

Alternatively, the composite may be finely divided silica particles having a phase change material contained therein. The silicas that are suitable include those made by the fumed or precipitated process, and having surface areas ranging from 50 to 500 square meters per gram, and primary particle sizes from 0.005 to 0.025 microns. Preferred silicas are those having a surface area of 100 $m^2$ per gram or more, and primary particle size of 0.020 microns or less. Further, the silicas prepared by either the fumed or precipitated process can be modified to make them less hydrophilic, or even hydrophobic by surface treating them with effective concentrations of silane coupling agents (e.g., dimethyldichlorosilane) or silicone resins. The silicone resin surface treatment can and usually is followed by heat treating at elevated temperature wherein the silicone resin is chemically reacted with hydroxyl groups on the surface of the silica particles.

The phase change material may consist of one or more of the following compositions: water, water/urea clathrate, quaternary ammonium halide clathrates, linear alkyl hydrocarbons, fatty acids, alcohols and esters, glycerine, pentaerythritol, pentaglycerine, neopentylglycol, polyethylene glycol and like materials characterized by having thermal energy storage of 30 cal/gm or higher, and a narrow temperature range of melting and freezing. The phase change material may have added to it additives such as fire retardants, heat transfer agents, or mixtures thereof. The silica particles containing a phase change material in the matrix thereof may be packed in a container, such as a plastic bag, a metallic pouch, a plastic box, a metal box, sized to fit in the hollow core of the block.

In yet another embodiment, the composite is a formed cementitious plug having a phase change material incorporated therein. The cementitious plug is one sized to fit the hollow core of the block and preferably is formed of a cement and lightweight expanded shale mixture as sold under the trademark Solite by Solite Corp. of Richmond, Virginia. The phase change material may be incorporated in the cementitious plug in several different ways. In one instance the cement is set and, then, the phase change material, such as a crystalline alkyl hydrocarbon having a heat of fusion of greater than about 30 cal/g, imbibed into the pores and matrix of the formed cementitious plug. It has been found that a cementitious plug formed of Solite is particularly receptive to being imbibed with an alkyl hydrocarbon phase change material and is particularly adept at holding the phase change material in its matrix over a range of conditions. In another instance, polyolefin pellets containing a phase change material, as described above, may be added to the wet mix stage during formation of the formed cementitious plug. In yet another instance silica particles containing a phase change material, as also described above, may be added to the wet mix stage during formation of the formed cementitious plug.

Advantageously, it is possible to make the hollow core building block and the formed cementitious plug contemporaneously. That is done by providing a mold for a cementitious hollow core building block which has at least one and normally two central opening(s) representing the hollow core(s); pouring a settable cementitious slurry into the building block portion of that mold; either with the addition of a removable sleeve(s) to the central opening(s) or without it, pouring a settable composite, preferably a cementitious slurry having a phase change material contained within the matrix of finely divided silica particles or polyolefin pellets added to the cementitious slurry during the wet mix stage of formation of the slurry, into the central opening(s) in the mold; allowing the settable cementitious slurry and the settable composite to set; and removing the mold. It is also possible to mold the cementitious plugs in this manner and then imbibe them with a phase change material.

Preferably, the composite is a molded plastic plug having a phase change material incorporated therein. The plastic plug is one sized to fit the hollow core of the block and preferably is a solid formed from a melt-mix of a phase change material, such as a C-18 chain length paraffin, polyolefin resin, such as high density polyethylene (HDPE), ethylene copolymer, such as ethylene-vinyl acetate (EVA) and silica particles.

As with the cementitious plug, the plastic plug can be formed by melt-mixing the above listed ingredients as described in application Ser. No. 5,565,132, issued on 10/15/1996, and hereby incorporated by reference, and, then, pouring that settable composition in the central opening(s) in the mold center with or without prelining the central opening (s) with a removable sleeve.

Finally, the phase change material, such as C-14 and higher linear alkyl hydrocarbons having a thermal energy storage of 30 cal/g or higher, can be contained in neat form or in a phase change material/silica gel, in containers, such as a plastic bag, a metallic pouch, a plastic box, or a glass or metal box, shaped to fit into the hollow core(s) of a cementitious hollow core building block.

The building products of the present invention provide considerable thermal energy storage and are useful for climate control and energy conservation.

Accordingly, it is an object of the present invention to provide cementitious building products having improved thermal energy storage properties in the form of cementitious hollow core building blocks containing a phase change material in the hollow core.

These, and other objects and advantages of the present invention, will become apparent from the following detailed description and the accompanying claims.

BRIEF DESCRIPTION OF THE DRAWINGS

FIG. 1 is an exploded view of the cementitious hollow core building block containing a phase change material in the cores thereof.

FIG. 2 is a perspective view of the method of forming a cementitious hollow core building block prior to containing a phase change material.

DETAILED DESCRIPTION OF THE PREFERRED EMBODIMENT

Referring to FIG. 1 there is shown a cementitious hollow core building block 11 having hollow cores 12 and 12A into which composites 20 and 20A are sized to fit, forming a building product 10 having thermal energy storage properties.

The hollow core building block 11 may be made of concrete/sand/aggregate as is customary. Such hollow core building blocks typically weight about 40 lbs. Alternatively, the hollow core building block 11 may be made of Solite, a cement and lightweight expanded shale filler mixture available from Solite, Inc. of Richmond, Virginia. Hollow core building block 11 may also be made of other combinations of pozzolonic materials and sand and aggregate.

Hollow core building block 11 as formed has two hollow cores 12 and 12A. It is into these hollow cores that composites 20 and 20A are inserted. Composites 20 and 20A are formed of containment means 22 and 22A, which are diagrammatically represented as plugs, containing phase change material 24 and 24A, which are diagrammatically represented as particles. But it is to be understood that the phase change material is introduced into whatever matrix it is to be contained as a liquid and will not itself be in particulate form. If the matrix is polyolefin pellets or finely divided silica particles then the particulate representation is more accurate.

Thus, in one embodiment of the present invention containment means 22 and 22A may be formed cementitious plugs having phase change material 24 and 24A in the form of polyolefin pellets containing a phase change material or silica particles containing a phase change material added to the wet mix stage during formation of the formed cementitious plugs.

The polyolefin pellets containing a phase change material may be prepared as disclosed in my U.S. Pat. No. 5,053,446, which is hereby incorporated by reference. As disclosed there representative examples of polyolefins which are useful in preparing the pellets are crystalline polyolefins such as polyethylene, polypropylene, polybutene, crystalline polystyrene, crystalline chlorinated polyethylene and poly (4-methylpentene-1). Crystalline ethylene copolymers such as ethylene vinyl acetate, crystalline ethylene acrylate copolymers, ionomers, crystalline ethylene-butene-1 copolymers and crystalline ethylene-propylene copolymers are also useful polyolefins. Preferably, the polyolefins are crosslinked such that they are form stable upon heating above their crystalline melting point.

The size of the pellets of the present invention are not limited. They may range from about 1 micron to 5 mm in their largest dimension, and preferably range from about 0.5 to 3.0 mm. While various shapes may be used, the pellets are typically spherically or cylindrically shaped, although elongated particles, cubes, monofilaments or fibers can also be used.

Substantially any phase change material can be used which is compatible with the polyolefin. In most cases, compatible phase change materials will be characterized by a long alkyl hydrocarbon chain within their molecular structure. Preferred phase change materials are crystalline organic compounds such as crystalline alkyl hydrocarbons, crystalline fatty acids, crystalline fatty acid esters, crystalline 1-olefins, crystalline 1-halides, crystalline primary alcohols, crystalline alicyclic hydrocarbons, and crystalline aromatic hydrocarbons which melt and freeze within the desired thermal transfer temperature range (e.g., 0 to 80° C.).

A number of commercially available waxes are useful as phase change materials in the present invention including Shellwax 100 (MP 42–44° C.), Shellwax 120 (MP 44–47° C.), Shellwax 200 (MP 52–55° C.), Shellwax 300 (MP 60–65° C.) all of which are products of Shell Oil Co., Houston, TX; Boron R-152 (MP 65° C.) a product of BP America, Cleveland, OH; Union SR-143 (MP about 61° C.) a product of Union Oil Co., Los Angeles, CA; Witco 128 (MP about 53° C.), Witco LLN, Witco 45A, Witco K-18, Witco K-19, Witco K-61, Witco K-51, and Witco 85010-1 all products of Witco Corp., New York, NY; Aristowax 143 (MP 34–61° C.) from Unocal Corp., Los Angeles, CA, and Paraffin 150 (MP about 61° C.). These waxes have heats of fusion greater than 30 cal/g and by comparison to other phase change materials, they are inexpensive. Many of them cost as little as 15¢ (U.S.) per pound when purchased in a tank car quantity.

The phase change material is preferably incorporated into the polyolefin pellets by immersing the crosslinked polyolefin pellets into a bath of melted phase change material. The temperature of the phase change material should be higher than the crystalline melt point of the polyolefin to imbibe the maximum amount of the phase change material. The polyolefin pellets are retained in the bath until at least about 10% by weight of the straight chain alkyl hydrocarbon is absorbed.

Alternatively, the phase change material may be melt stirred into uncrosslinked polyolefin heated above its melting point and, then, the material formed into pellets. Fire retardants (such as aluminum trihydrate, monoammonium phosphate, urea, or halogenated fire retardants) can be added along with the phase change material. Also, heat transfer agents (such as aluminum flake, silica or copper powder) can be incorporated into the polyolefin pellets.

The finely divided silica particles containing a phase change material in the matrix thereof may be prepared as disclosed in my U.S. Pat. Nos. 5,106,520 and 5,282,994, both of which are hereby incorporated by reference. As there disclosed, a preferred silica is a precipitated hydrophilic silica having a particle size of 0.005 to 0.025 microns and a surface area of 100 m$^2$ per gram or more. An example is ABS silica from PPG Industries Inc., of Pittsburgh, PA, which is a normal, hydrophilic silica with a surface area of 150 m$^2$/gram and a particle size of about 0.022 microns. Fumed silica particles may also be used.

Preferably, the silica is a precipitated hydrophilic silica that has been further surface treated to render it less hydrophilic, partially hydrophobic, or hydrophobic. Preferably the silica is treated with 1–15 pph (parts per hundred by weight) of a silane coupling agent such as dimethyldichlorosilane or silicone resin. The preferred degree of hydrophobic character depends on the type of phase change material being used. For example, with water as the phase change material, the silica should be completely hydrophilic or only slightly (i.e. around 1 pph) waterproofed by surface treatment. When a non-water phase change material/silica dry powder is to be used in a moist environment (i.e. where phase separation can occur quickly as the silica preferentially absorbs water and desorbs the non-water phase change material), then a less hydrophilic, partially hydrophobic, or hydrophobic silica is preferred.

With the finely divided silica particles, the list of useable phase change materials is long, including a water/urea clathrate as disclosed in my copending application Ser. No. 08/228,147, filed Apr. 15, 1994, the disclosure of which is hereby incorporated by reference. Other useable phase change materials include water, quaternary ammonium halide clathrates, linear alkyl hydrocarbons, and fatty acids, primary alcohols, esters, 1-olefins, and halogenated hydrocarbons having a heat of fusion of greater than about 30 cal/g. As with the polyolefin pellets, a crystalline alkyl hydrocarbon having a carbon chain of about 14 carbon atoms or greater is preferred in many instances.

Rather than incorporating the polyolefin pellets or silica particles containing the phase change material in a cementitious plug, they can be inserted into hollow cores 12 and 12A of the hollow core building blocks 10 in other types of containment means 22 and 22A. For example, the containment means may be a plastic bag, a metallic pouch, a plastic box, or a metal box sized to fit into the hollow core, into which the polyolefin pellets or silica particles containing the phase change material are packed. Neat C-14+ or C-14+/ silica gel can also be placed in a container, such as a plastic bag, a metallic pouch, a plastic box, or a glass or metal box, shaped to fit into the hollow core(s) of a cementitious hollow core building block.

Still, the preferred form of composites 20 and 20A is as a formed solid plug. As mentioned, that formed plug may be a formed cementitious plug having polyolefin pellets or silica particles containing a phase change material added to the wet mix stage during formation of the formed cementitious plug. Alternatively, the cementitious plug may be formed and, then, imbibed with a phase change material such as a crystalline alkyl hydrocarbon. The preferred cementitious material is a cement and lightweight expanded shale mixture sold under the trademark Solite by Solite, Inc. of Richmond, Virginia. After cementitious plugs are formed by pouring an aqueous slurry of the cementitious material in a mold sized to produce plugs which fit into the hollow cores 12 and 12A and then set, a crystalline alkyl hydrocarbon heated to above its melting point may be imbibed into the pores and matrix of the cementitious plugs to produce composites 20 and 20A.

The alkyl hydrocarbons may be permeated into the cementitious plugs in combination with a polar hydrocarbon such as stearyl alcohol which functions similar to a wetting agent by enhancing the affinity of the hydrocarbon for the cement and enabling the hydrocarbon to permeate the cementitious plug better.

Certain flame-resistant agents may also be used in combination with the crystalline alkyl hydrocarbons to confer flame retardancy. Certain halogenated hydrocarbons are useful for this purpose. These hydrocarbons are preferably used with a polyvalent metal oxide such antimony oxide, which reacts with the halogen liberated upon combustion and generates a dense snuffing gas.

The mold for formation of the cementitious plugs may be the mold for the hollow core building block itself so as to form the hollow core building block and the cementitious plugs contemporaneously. That is shown in FIG. 2 where assembly 40 includes mold 42 which the cementitious slurry for hollow core building block 41 is poured. The hollow core portions 45 and 45A of mold 42 may optionally be further lined with removable sleeves 43 and 43A. In any event the cementitious slurries 44 and 44A, which may include polyolefin pellets or silica particles containing a phase change material. Such a cementitious slurry is poured into the hollow core portions 45 and 45A and set. If the phase change material has not already been added, after unmolding, the cementitious plugs which have thus been formed are, then, imbibed with a phase change material prior to insertion of the cementitious plugs back into the hollow cores.

Most preferred is a formed solid plug of a thermoplastic, moldable, non-exuding phase change material such as the composite disclosed in my copending U.S. Pat. No. 5,565, 132, issued on 10/15/1996.

As there disclosed, that composite preferably comprises a solidified melt mixture of polyolefin resin, an ethylene copolymer, silica particles, and an alkyl hydrocarbon phase change material. The polyolefin resin is preferably an uncrosslinked high density polyethylene (HDPE); although, a higher melting polypropylene may also be used. The ethylene copolymer is preferably an ethylene-vinyl acetate copolymer (EVA) containing approximately 10-20% by weight vinyl acetate, but may also be an ethylene-methyl acrylate copolymer, an ethylene-ethyl acrylate copolymer, or equivalent molar copolymer. The silica particles are preferably precipitated silica particles having a surface area of from 50 to 500 square meters per gram and primary particle sizes of from 0.005 to 0.025 microns such as ABS silica from PPG Industries Inc.; although, fumed silicas can also be used. The alkyl hydrocarbon phase change material is preferably a crystalline alkyl hydrocarbon having a heat of fusion of greater than about 30 cal/g, such as a paraffin having a C-18 or C-19 chain length and a melting and freezing point of about 75° F.

The preferred weight percentage of each ingredient based on the total weight of the composite is about 60% phase change material, about 16–22% polyolefin, about 8–12% ethylene copolymer, and about 8—16% silica particles.

The method of preparing the composite involves melting an alkyl hydrocarbon phase change material, stirring silica particles into that melted material until a stiff gel is formed, adding to the stiff gel a mixture of polyolefin resin and ethylene polymer, heating to melt the polyolefin resin and ethylene copolymer, mixing vigorously to form a uniform viscous gel, cooling the viscous gel to solidify it into a moldable composite, and forming the moldable composite into a plug shape by compression molding, injection molding or extrusion which will fit into hollow cores 12 and 12A. As with the cementitious plug, that may be done in situ.

EXAMPLE

This prophetic example illustrates the various ways phase change materials can be added to the hollow core of Solite blocks and, then, presents a calculation of the thermal energy storage ability in each instance.

Process No. 1 – In the first approach, Solite core inserts can be molded, imbibed with a phase changed material such as Witco K-18 from Witco Corp., and inserted in the hollow block at the plant, or as the wall is being "laid up".

Process Nos. 2 and 3 – The phase change material can also be included into the cement/Solite hollow-core in the form of phase change material/hydrophobic silica dry powder, or phase change material/cross-linked high density polyethylene pellets. In either of these approaches, using containing core inserts, there should be no reduction in the strength of the Solite blocks. The molded cores of the above compositions will have lower compressive strength, but core strength is unimportant.

Process Nos. 4 and 5 – The phase change material/silica dry powder or the phase change material/cross-linked HDPE pellets can be contained in a plastic bag, blow molding, or other container, and inserted into the core space of the hollow block, either at the plant, or as the block is being laid up in a wall or partition. These methods provide greater flexibility than in process Nos. 1–3, since materials of slightly different melting temperature can be more readily incorporated in blocks for use in different sides of the building or for different climates. In either case, there should be no reduction in the strength of the base cement/Solite hollow core-block.

Process Nos. 6 and 7 – Melt-mixed solid molding or pellets of phase change material/uncrosslinked HDPE/EVA/ ABS silica can also be inserted into the free core space of the hollow blocks.

As is shown in Table II below, placing the phase change material as a solid phase change material/uncrosslinked HDPE/EVA/ABS silica molding into the core space of a conventional Solite or concrete hollow block, can potentially supply much larger amounts of thermal energy storage than any of the other methods mentioned above. This is due to the higher apparent density of the melt-mix blend as compared to either phase change material/silica dry powder or phase change material/cross-linked HDPE pellets. The higher density and the silica particles lead to higher thermal conductivity.

The basic assumptions for the calculations for the amount of storage available in a model house (wall space = 2 x (30'+40')x10) which uses hollow-core blocks containing inserts made by different processes are presented in Table I. Projections of thermal storage in different processes are compiled in Table II. Thermal storage in excess of 1,000,000 BTU can be obtained in the standard hollow-core blocks of a modestsixed (30'+40')x10') outer wall, and even more, if some inside walls are also made of phase change material-containing blocks or plasterboards. This compares with 224,000 BTUs potentially available for a similar size house built with prior art imbibed blocks (Process 8 in Table II).

The different methods were analyzed for potential thermal storage capacity for different forms of the Witco K-18 phase change material as shown in Process 1 through 8 in Table II.

TABLE I

| | |
|---|---|
| Weight of Solite Blocks (lbs) | = 25 lbs. |
| Volume of Solite Block (in$^3$) = 8" × 8" × 16" | = 1024 in$^3$ |
| Volume of Solite Block (ft$^3$) = $\frac{in^3}{1728} - \frac{1424}{1728}$ | = 0.59 ft$^3$ |
| Core Space of Solite Blocks at 55% Vol = 0.59 × 0.55 | = 0.325 ft$^3$ |
| Surface Area of Solite Block (in$^2$) = 8" × 16" | = 128 in$^2$ |
| Surface Area with ¼" mortar bond 8⅓ × 16½ | = 140 in$^2$ |
| Surface Area with ½ mortar bond 9 × 17 | = 153 in$^2$ |
| Therefore, if each block averages 144 in$^2$ or (ft$^2$), the number of blocks for building is the same as surface area in ft$^2$ | |
| Example Building 30' × 40' with 10' height | |
| Wall Area = (30 + 30 + 60 + 60) × 10 | = 1400 ft$^2$ |
| | = 1400 blocks |
| Thermal Storage K-18 (BTU/lb = cal/gm × 1.8) | = 45 × 1.8 |
| | = 80 BTU/lb |

TABLE II

| OPTIONS | DESCRIPTION | CALCULATED THERMAL ENERGY (BTU) |
|---|---|---|
| Process 1 | imbibing cement/Solite core-inserts at 8% K-18 | 273,280 |
| Process 2 | Core-inserts with in-situ K-18/ hydrophobic-silica (65/35) at 4.6% dry powder | 102,480 |
| Process 3 | Core-inserts with in-situ K-18/ crosslinked HDPE (70/30) pellets at 5% pellets | 119,560 |
| Process 4 | Filling the hollow-core of cement/Solite blocks with K-18/ silica (65/35) dry powder | 812,011 |
| Process 5 | Filling the hollow-core of cement/Solite blocks with K-18/ HDPE (70/30) pellets | 953,971 |
| Process 6 | Filling the hollow-core of cement/ Solite blocks with K-18/HDPE/EVA/ ABS (60/16/8/16) castings | 1,361,920 |
| Process 7 | Filling the hollow-core of cement/Solite blocks with K-18/ HDPE/EVA/ABS (60/16/8/16) pellets | 817,690 |
| Process 8 | Imbibing K-18 into the whole cement/Solite blocks at 8% K-18 | 224,000 |

As is very apparent, the thermal storage potentially available in Processes 4–7 is much greater than needed for effective heating and cooling. However, the availability of this large capacity provides several capabilities not heretofore available:

*First,* different phase change materials can be simultaneously inserted into separate core sections for more effective heating and cooling as compared with a single phase change material (e.g., K-18 and K-19) for both heating and cooling.

*Second,* the fire problem is diminished since the phase change material is isolated from both the inside and outside of the building by the non-combustible inorganic block matrix.

*Third,* neither the manufacturing process, nor the physical properties of cement/Solite blocks are compromised in any way since the phase change material (in whatever form) is inserted into the finished block, either at the factory, or in the field when the blocks are being formed into a building wall (with mortar joints unaffected).

*Fourth,* since the phase change material is contained in the perimeter wall (unlike wallboard or other building structures imbibed with a phase change material as shown in the prior art), there is no necessity to provide for getting the sunlight into the interior of the house for winter heating, or night air recharging for summer cooling. These requirements automatically occur (as in Trombe wall, or a house with very thick walls and high thermal mass).

*Fifth,* the combination of all the features mentioned above makes the phase change material/hollow-core block more attractive and much easier to commercialize than the phase change material wallboard for energy conservation. Wallboard, imbedded with phase change material, however, continues to be of primary interest for electric peak load shifting, wherein lower cost nighttime energy is used for daytime heating. For this use, solar insulation is unnecessary, and the technology can be utilized in any climate in any type of house, including retrofitting of existing buildings. However, the economic viability of peak shaving to the homeowner depends on the utilities providing a significantly low rate for off-peak electricity. This is already common in Japan, and will likely also be in the United States in the near future.

While certain representative embodiments and details have been shown for purposes of illustrating the invention, it will be apparent to those skilled in the art that various changes in the products and methods disclosed herein may be made without departing from the scope of the invention, which is defined in the appended claims.

What is claimed is:

1. A building product having thermal energy storage properties comprising a cementitious hollow core building block having at least one hollow core and having within said hollow core a composite selected from the group consisting of a povyolefin matrix having a phase change material contained within the matrix thereof finely divided silica particles having particle sizes of about 0.005 microns to about 0.025 microns and having a phase change material contained within the matrix thereof; and a formed cementitious plug having a phase change material incorporated therein.

2. The building product of claim 1 wherein said composite is a formed cementitious plug having a phase change material incorporated therein by adding said phase change material to the wet mix stage during formation of said formed cementitious plug.

3. The building product of claim 2 wherein said phase change material is contained within the matrix of finely divided silica particles having particle size of about 0.005 to about 0.025 microns and the silica particles containing the phase change material are added to the wet mix stage during formation of said formed cementitious plug.

4. The building product of claim 2 wherein said phase change material is contained within the matrix of polyolefin pellets and the polyolefin pellets containing the phase change material are added to the wet mix stage during formation of said formed cementitious plug.

5. The building product of claim 4 wherein said polyolefin pellets are cross-linked high density polyethylene.

6. The building product of claim 1 wherein said composite is a formed cementitious plug having a phase change material incorporated therein by imbibing said phase change material into said formed cementitious plug.

7. The building product of claim 6 wherein said formed cementitious plug is formed of a cement and lightweight expanded shale mixture.

8. The building product of claim 7 wherein said phase change material is an crystalline alkyl hydrocarbon having a heat of fusion of greater than about 30 cal/g.

9. The building product of claim 1 wherein said composite is a container packed with polyolefin pellets having a phase change material contained within the matrix thereof.

10. The building product of claim 9 wherein said container is selected from the group consisting of a plastic bag, a metallic pouch, a plastic box, and a metal box.

11. The building product of claim 10 wherein said phase change material is a crystalline alkyl hydrocarbon having a heat of fusion of greater than about 30 cal/g.

12. The building product of claim 11 wherein said phase change material further includes an additive selected from the group consisting of fire retardant, heat transfer agents, and mixtures thereof.

13. The building product of claim 11 wherein said polyolefin pellets are cross-linked high density polyethylene pellets.

14. The building product of claim 11 wherein said polyolefin pellets are high density polyethylene/ethylene vinyl acetate pellets.

15. The building product of claim 1 wherein said composite is a container packed with finely divided silica particles having particle sizes of about 0.005 to about 0.025 microns and having a phase change material contained within the matrix thereof.

16. The building product of claim 15 wherein said container is selected from the group consisting of a plastic bag, a metallic pouch, a plastic box, and a metal box.

17. The building product of claim 15 wherein said phase change material is selected from the group consisting of water, water/urea clathrate, quaternary ammonium halide clathrates, linear alkyl hydrocarbons, and fatty acids, primary alcohols, 5 esters, 1-olefins, and halogenated hydrocarbons having a heat of fusion of greater than about 30 cal/g.

18. The building product of claim 17 wherein said phase change material further includes an additive selected from the group consisting of fire retardants, heat transfer agents, and mixtures thereof.

19. The building product of claim 1 wherein said composite is a molded polyolefin plug having a metrix and having a phase change material contained within the matrix by melt mixing said phase change material with polyolefin heated above its melting point prior to molding said polyolefin plug.

20. The building material of claim 19 wherein said molded polyolefin plug is a high density polyethylene/ethylene vinyl acetate.

21. The building material of claim 19 wherein said phase change material is a crystalline alkyl hydrocarbon having a heat of fusion of greater than about 30 cal/g.

22. A building product having thermal energy storage properties comprising a Cementitious hollow core building block having at least one hollow core and having within said hollow core a molded high density polyethylene/ethylene vinyl acetate plug having a matrix structure and having a phase change material contained within the matrix by melt mixing said phase change material and silica particles into high density polyethylene/ethylene vinyl acetate above the melting point of polyethylene/ethylene vinyl acetate prior to molding said plug.

* * * * *